United States Patent
Denice, Jr. et al.

(10) Patent No.: US 6,871,561 B2
(45) Date of Patent: Mar. 29, 2005

(54) ISOLATOR AND ASSEMBLY CONFIGURATION

(75) Inventors: Michael W. Denice, Jr., Westlake Village, CA (US); John G. Mark, Pasadena, CA (US); Daniel A. Tazartes, West Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/093,158

(22) Filed: Mar. 7, 2002

(65) Prior Publication Data

US 2003/0167863 A1 Sep. 11, 2003

(51) Int. Cl.[7] .......................... G01D 21/00; F16M 1/00; F16F 1/00
(52) U.S. Cl. .................. 73/866.5; 248/614; 248/638; 267/150
(58) Field of Search ................... 248/614, 638; 33/573; 73/866.5; 267/150

(56) References Cited

U.S. PATENT DOCUMENTS

| | | | | |
|---|---|---|---|---|
| 3,565,386 A | * | 2/1971 | Lemkuil et al. | 248/358 |
| 3,625,466 A | * | 12/1971 | Marshall et al. | 248/358 R |
| 3,751,024 A | * | 8/1973 | Pineau | 267/153 |
| 4,372,431 A | * | 2/1983 | Desjardins | 188/380 |
| 4,403,681 A | * | 9/1983 | Desjardins | 188/379 |
| 4,798,006 A | * | 1/1989 | Barnaby | 33/573 |
| 5,074,159 A | * | 12/1991 | Wizman et al. | 74/5.47 |
| 5,267,720 A | * | 12/1993 | Brazell et al. | 248/638 |
| 5,305,981 A | * | 4/1994 | Cunningham et al. | 248/550 |
| 5,464,187 A | * | 11/1995 | Linkner, Jr. | 248/635 |
| 6,022,005 A | * | 2/2000 | Gran et al. | 267/136 |
| 6,354,559 B1 | * | 3/2002 | Eisentraut | 248/638 |
| 6,371,434 B1 | * | 4/2002 | Becker et al. | 248/610 |

* cited by examiner

Primary Examiner—Charles Garber
(74) Attorney, Agent, or Firm—Patti & Brill, LLC

(57) ABSTRACT

Multiple isolators are configured with respect to an assembly (101), such as a sensor assembly in an inertial navigation system or other system where cross-axis acceleration or rotation coupling is undesirable. The system utilizes a set of isolators (203, 209, 215, and 221; 305, 307, 311, 313, 317, 319, 323, 325; or 403, 405, 407, 411, 413, and 415) that are substantially matched to each other, but may have uncorrelated axial stiffness and radial stiffness. The system configuration does not introduce cross-axis coupling, such as cross-axis translational coupling and cross-axis rotational coupling.

13 Claims, 2 Drawing Sheets

US 6,871,561 B2

ISOLATOR AND ASSEMBLY CONFIGURATION

FIELD OF THE INVENTION

This invention relates to isolators, including but not limited to isolator orientation in inertial navigation systems.

BACKGROUND OF THE INVENTION

Strapdown inertial navigation systems are frequently used in missiles and aircraft. A state-of-the-art strapdown inertial navigation system has three rotation sensors or gyroscopes (gyros) and three specific force sensors or accelerometers rigidly attached to a supporting vehicle. The gyros are each positioned and oriented to sense angular displacement about one of three defined orthogonal axes attached to the vehicle body and known as the body coordinate system. The accelerometers are each positioned and oriented in a fixed direction relative to the vehicle in order to sense velocity changes (incremental velocities) along the three defined orthogonal axes.

The gyros and accelerometers have fixed relative directions in the body coordinate system. An angular transformation matrix of direction cosines is computed in an attitude integration apparatus. The accelerometer signals, e.g., incremental changes in velocity, in the strapdown body coordinate system are converted in a coordinate transformation computer from that system into corresponding signals in the stabilized navigation coordinate system.

A rotation matrix is created in the attitude integration apparatus to transform vector body-coordinate signals from the body coordinate system of the instruments to the navigation coordinate system. The transformed signals are used to calculate and create signals that are measures of the local geographical position of the vehicle and the direction of the local gravity. The transformation matrix also yields signals that are measures of the angular orientation of the supporting vehicle relative to the navigation coordinate system.

The data used to compute the transformation matrix is sampled at finite periodic intervals, causing the bandwidth of the signals to be limited. When the instruments experience vibrations that occur at frequencies above or near the upper limit of the bandwidth of the transformation, where the response is poor, rectification errors occur in the calculated incremental velocity signals, and the navigation coordinate system signals are degraded. The rectification errors producing such degradation are typified by sculling and coning errors. A faster sampling rate of the instrument signals and/or compensation algorithm(s) may be utilized to improve the transformation of incremental velocity from body coordinates to navigation coordinates, although such methods result in additional cost and/or complexity of design due to additional implementation needed to accomplish the task. In addition, the instruments themselves may exhibit sensitivities to vibration. For example, gyros may falsely indicate a rotational vibration motion in response to a translational vibration motion. Such erroneous signals combined with true rotational motion may cause rectification resulting in severe degradation in the attitude integration.

Iso-inertial iso-modal instrument sensor assemblies and suspension systems have been used to support gyros and accelerometers in strapdown inertial navigation systems. These suspension systems used with the sensor assemblies employ multiple (typically 4 or more) isolators to provide shock and vibration isolation for the sensors. The suspension systems reduce the amount of high frequency vibration energy experienced by the sensors. Cylindrically symmetric isolators, i.e., symmetric about the axial direction, are a convenient design choice because they are relatively easy to manufacture and use. These iso-modal isolator suspension systems provided a significant vibration performance improvement as compared to their predecessors. Such suspension systems, however, may exhibit cross-axis acceleration and rotational coupling, for example, in the presence of vibration. This cross-axis coupling is caused by difference in stiffness in the isolators depending on direction, e.g., the radial stiffness is different from the axial stiffness. When all the isolators are substantially matched to one another, the configuration does not exhibit acceleration to rotation coupling, although radial to axial mismatch causes cross-axis acceleration coupling and cross-axis rotation coupling.

A sensor assembly may be illustrated as a cube that is inherently iso-inertial, such as the cube 101 in FIG. 1, which shows an example of a suspension system using four isolators. The isolators 105 are arranged in a tetrahedral configuration, i.e., the isolators 105 are located at every other corner 107 of the cube. The axes of the isolators 105, e.g., the axial direction, are all parallel to one another. In the example of FIG. 1, the isolator axes are all parallel to a diagonal 103 of the cube. When the isolators 105 have the same axial and radial properties, the three translational eigen-frequencies are the same, the three rotational eigen-frequencies are the same, and the ratio of the rotational to translational frequency is determined strictly from geometric considerations and dimensions.

When the axial stiffness and radial stiffness are not equal, the translational eigen-frequencies separate as do the rotational eigen frequencies. This separation leads to cross-axis translational coupling and cross-axis rotational coupling, which may result in errors in determination of, for example, system attitude, acceleration, velocity, and/or position. There are, however, no cross-coupling terms between translation and rotation.

Accordingly, there is a need for a sensor assembly that utilizes isolators without additional cost and/or complexity of design, yet without cross-axis translational coupling and cross-axis rotational coupling.

SUMMARY

An apparatus comprises an assembly having a center point and a plurality of isolators. Each isolator is substantially axially symmetric about one of a plurality of axes. Each isolator is operably coupled to the assembly such that each of the plurality of axes substantially converges at the center point.

DESCRIPTION OF A PREFERRED EMBODIMENT

The following describes an apparatus for and method of configuring isolators with an assembly such as a sensor assembly in an inertial navigation system or other system where cross-axis acceleration or rotation coupling is undesirable. The suspension system utilizes a set of isolators that are substantially matched to each other, but may have uncorrelated axial stiffness and radial stiffness, without introducing cross-axis coupling, such as cross-axis translational coupling and cross-axis rotational coupling. The following further provides an additional degree of freedom that makes it possible to independently adjust the suspension's translational and rotational resonances relative to one another simply by adjusting the radial stiffness and axial stiffness relative to each other.

Figure 1:
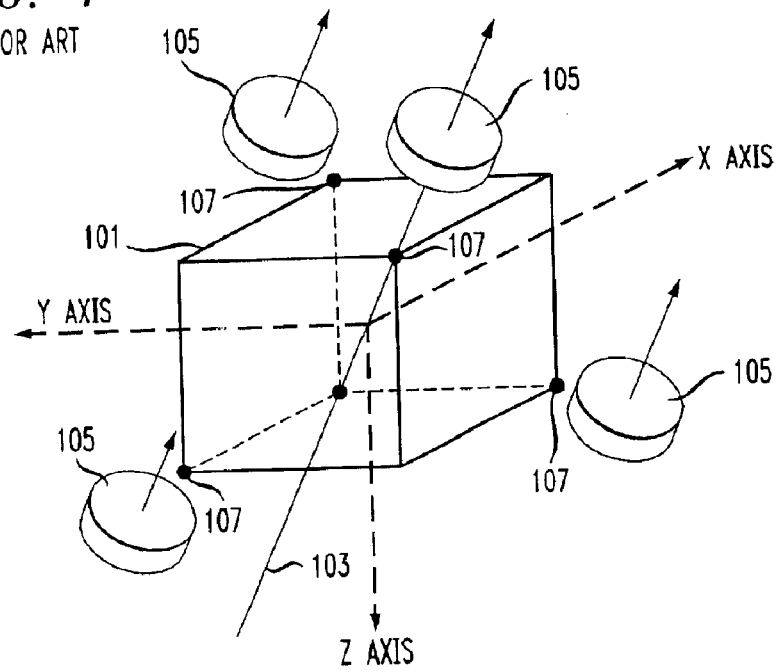
FIG. 1 is a diagram showing an exploded view of a typical sensor assembly in relation to its isolators as known in the art.
Figure 2:
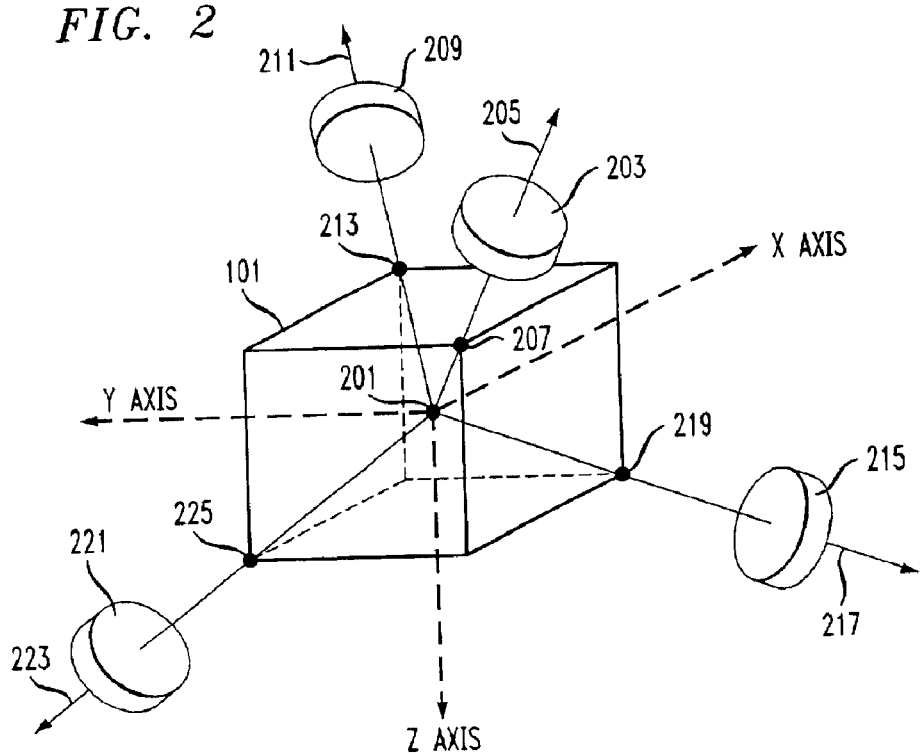
FIG. 2 is a diagram showing an exploded view of a sensor assembly in relation to four isolators in accordance with the invention.
Figure 3:
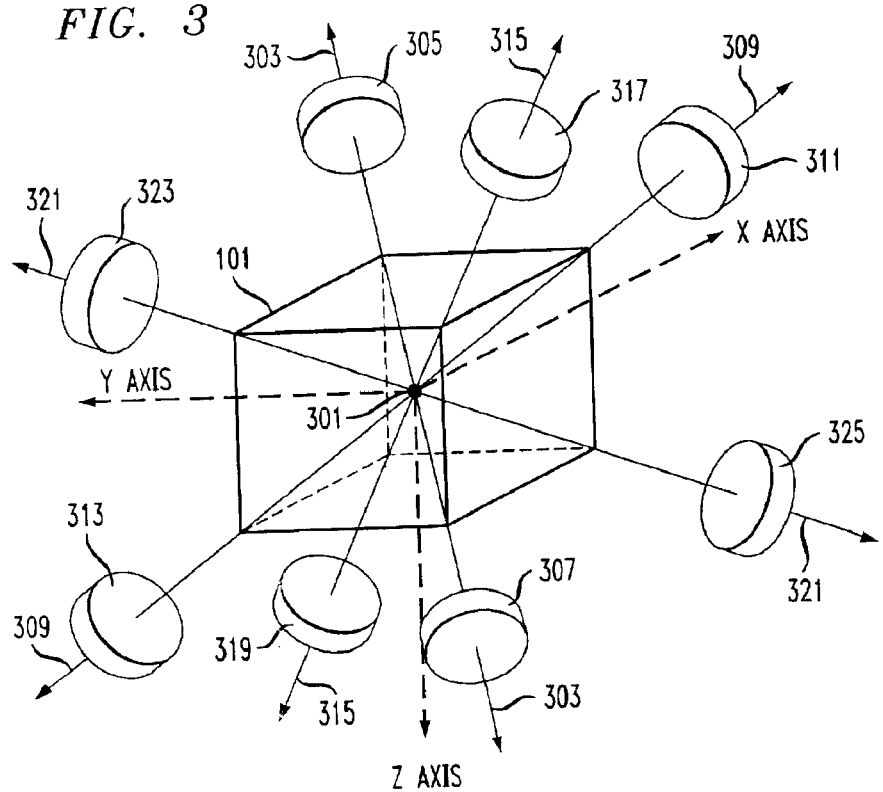
FIG. 3 is a diagram showing an exploded view of a sensor assembly in relation to eight isolators in accordance with the invention.
Figure 4:
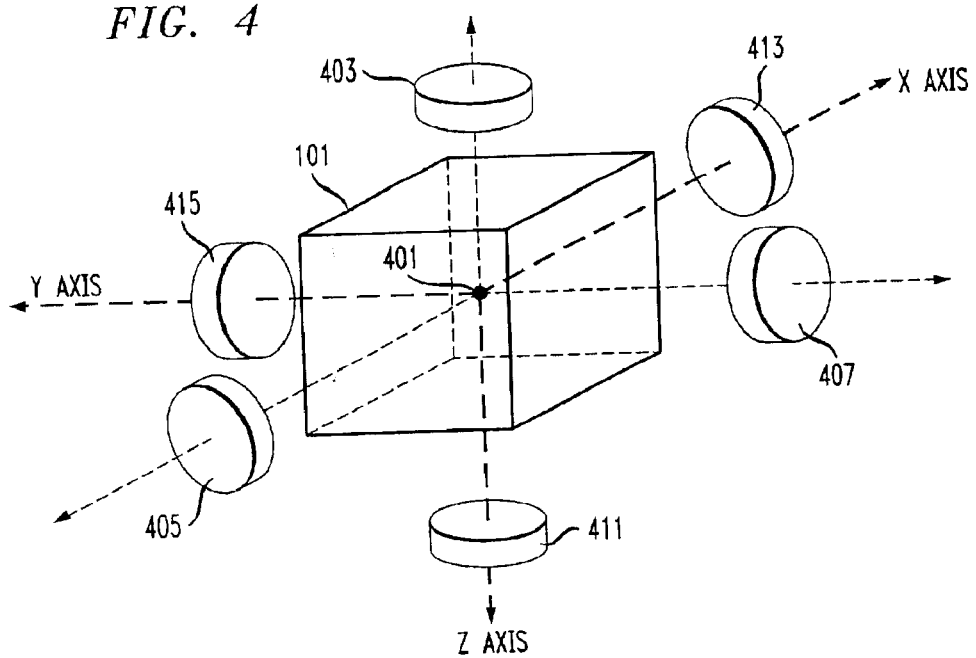
FIG. 4 is a diagram showing an exploded view of a sensor assembly in relation to six isolators in accordance with the invention.

The isolators in FIG. 1 through FIG. 4 are shown as cylinders for the sake of simplicity of the drawing, because the isolators exhibit axial symmetry in the same way cylinders do. The isolators form the suspension system for the assembly 101. An X-axis, Y-axis, and Z-axis provide three orthogonal axes that are attached to the vehicle to which the assembly 101 is attached, and will be referred to as orientation axes herein. Each orientation axis extends through the center point of two opposing surfaces of the assembly 101 as well as the center point 201, 301, or 401 of the assembly 101 itself, thus the orientation axes are perpendicular to the surfaces of the cube-like structure of the assembly. FIG. 2 through FIG. 4 illustrate examples utilizing 4, 8, and 6 isolators, respectively.

A diagram showing an exploded view of a sensor assembly in relation to four isolators is shown in FIG. 2. An assembly 101 is illustrated as a cube having a center point 201 that is the geometric center of the cube. The assembly 101 may be a sensor assembly typically used in navigation systems, such as those available from Northrop Grumman, Inc. The assembly 101 may include gyroscopes, accelerometers, pressure sensors, computing devices, and any other circuitry, hardware, and/or software that performs the desired functions of the assembly.

The four isolators in FIG. 2 exhibit a (regular) tetrahedral pattern, i.e., they are placed at every other corner of a cube. A first isolator 203 has an axis (of symmetry) 205 that extends through a first corner 207 of the assembly 101 and converges with the center point 201. A second isolator 209 has an axis (of symmetry) 211 that extends through a second corner 213 of the assembly 101 and converges with the center point 201. A third isolator 215 has an axis (of symmetry) 217 that extends through a third corner 219 of the assembly 101 and converges with the center point 201. A fourth isolator 221 has an axis (of symmetry) 223 that extends through a fourth corner 225 of the assembly 101 and converges with the center point 201. Thus, the axes 205, 211, 217, and 223 converge at the center point 201 of the assembly 101.

A diagram showing an exploded view of a sensor assembly in relation to eight isolators is shown in FIG. 3. The eight isolators 305, 307, 311, 313, 317, 319, 323, and 325 in FIG. 3 are placed one at each corner of the assembly 101, which has a center point 301 in this example. A first axis 303 that extends through two diagonally opposed corners of the assembly 101 as well as the center point 301 has two isolators 305 and 307 that share the axis 303 as an axis of symmetry. A second axis 309 that extends through two other diagonally opposed corners of the assembly 101 as well as the center point 301 has two isolators 311 and 313 that share the axis 309 as an axis of symmetry. A third axis 315 that extends through two additional diagonally opposed corners of the assembly 101 as well as the center point 301 has two isolators 317 and 319 that share the axis 315 as an axis of symmetry. A fourth axis 321 that extends through the two remaining diagonally opposed corners of the assembly 101 as well as the center point 301 has two isolators 323 and 325 that share the axis 321 as an axis of symmetry. Thus, the axes 303, 309, 315, and 321 converge at the center point 301 of the assembly 101.

A diagram showing an exploded view of a sensor assembly in relation to six isolators is shown in FIG. 4. The six isolators 403, 405, 407, 411, 413, and 415 in FIG. 4 are placed two on each orientation axis of the assembly 101, which has a center point 401 in this example. Because the orientation axes are perpendicular to and extend through the center of the surfaces of the assembly 101, each isolator 403, 405, 407, 411, 413, and 415 is centered about a different surface or face of the assembly, rather than a corner of the assembly, and two isolators are centered on each orientation axis. Thus, each isolator axis passes through the center of two opposing faces of the cube 101, and through the center 501 of the cube. In this example, the axes of the isolators 403, 405, 407, 411, 413, and 415 coincide with the orientation axes, which converge at the center point 401 of the assembly 101.

As long as all isolators are matched, the center point 201, 301, or 401 represents the elastic center of the suspension. When the center point 201, 301, or 401 coincides with the center of gravity of the assembly 101, static balance of the sensor assembly is achieved. When the center of gravity of an isolated sensor assembly substantially converges to the center point 201, advantage is gained minimizing translational to rotational coupling and vice-versa. Although FIG. 2, FIG. 3, and FIG. 4 show the axes converging at the center point 201, 301, and 401, respectively, of the assembly 101, manufacturing deviations may result in slight misconvergence of the axes at the center point 201, 301, or 401 of the assembly 101, which falls within the scope of the invention.

When the isolators' axial directions pass through the center of the cube, the three translational stiffness, and consequently, eigen-frequencies are identical even when the axial and radial isolator stiffness are mismatched. For identical isolators, the translational eigen-frequencies are determined by a geometrical combination of the axial stiffness and radial stiffness. The three rotational eigen-frequencies are also identical and depend only on the radial stiffness. The stiffness matrix for a four-isolator suspension system, such as shown in the example of FIG. 2, is derived as follows.

In a regular tetrahedral symmetric isolation system, four isolators are located at every other corner of a cube, for example, as shown in FIG. 2. The four vectors from the center of the cube to the center of each isolator are called $l_i$, where i=1, 2, 3, 4. The six degrees of freedom stiffness matrix, $K_i$, for the $i^{th}$ isolator may be written as:

$$K_i = \begin{bmatrix} [k_i] & [k_i][l_i]_x^T \\ [l_i]_x[k_i] & [l_i]_x[k_i][l_i]_x^T \end{bmatrix},$$

where

[$k_i$] is the usual stiffness tensor at the isolator center, and [$l_i$]$_x$ is the matrix form of the vector, $l_i$, such that [$l_i$]$_x$[V] is equivalent to the vector cross product, $l_i \times V$.

Thus, $$[l_i]_x = \begin{bmatrix} 0 & -l_z & l_y \\ l_z & 0 & -l_x \\ -l_y & l_x & 0 \end{bmatrix}.$$

The following properties come directly from tetrahedral symmetry:

$$l_i \cdot l_j = -\frac{1}{3}l^2, \; i \neq j;$$

$$\sum_{i=1}^{4} l_i = 0 \Rightarrow \sum_{i=1}^{4} [l_i]_x = 0; \text{ and}$$

$$\sum_{i=1}^{4} [l_i]_x [l_i]_x^T = \frac{8}{3}l^2[I]$$

For iso-elastic isolators, i.e., isolators that have the same elastic properties in all directions, $[k] = k_0[I]$, therefore the total stiffness matrix for iso-elastic isolators is:

$$K = \sum_{i=1}^{4} K_i = 4\begin{bmatrix} k_0[I] & [0] \\ [0] & \frac{2}{3}l^2 k_0[I] \end{bmatrix}.$$

It is desirable to achieve a similar result for isolators with axial symmetry. In this case, for each isolator, in isolator coordinates, $$k_i = \begin{bmatrix} k_a & & \\ & k_r & \\ & & k_r \end{bmatrix}, \; l_i = \begin{bmatrix} 1 \\ 0 \\ 0 \end{bmatrix}.$$

By directing that the axis of the $i^{th}$ isolator lie along vector $l_i$, in isolator coordinates, $$[l_i]_x [k_i] = k_r [l_i]_x \begin{bmatrix} 0 & & \\ & 1 & \\ & & 1 \end{bmatrix} = k_r [l_i]_x$$

and does not depend on $k_n$. From geometry, it follows that $$\sum_{i=1}^{4} [l_i]_x [k_i] = k_r \left( \sum_{i=1}^{4} [l_i]_x \right) = 0.$$

From symmetry, the remaining two sub-matrices are diagonal, and $$\sum_{i=1}^{4} k_i = 4\left(\frac{2k_r + k_a}{3}\right)[I] = 4k_{average}[I]$$

and $$\sum_{i=1}^{4} [l_i]_x [k_i] [l_i]_x^T = \frac{8}{3} k_r l^2 [I].$$

Because the structure is iso-elastic in rotation, the total stiffness matrix for the axial-symmetric, axial-convergent suspension is:

$$K = \sum_{i=1}^{4} K_i = 4\begin{bmatrix} k_{average}[I] & [0] \\ [0] & \frac{2}{3}l^2 k_r[I] \end{bmatrix},$$

which has a similar appearance to the total stiffness matrix for iso-elastic isolators.

This technique may be extended to other isolator configurations using, for example, six or eight isolators as shown in FIG. 4 and FIG. 3, respectively, as long as the isolator axes pass through the center point/center of gravity of the sensor assembly.

When matched or substantially matched isolators, i.e., isolators having substantially similar physical characteristics such as radial stiffness and axial stiffness, cross-axis acceleration coupling and cross-axis rotational coupling in the resultant assembly are substantially eliminated, even when the isolators are not iso-elastic.

Because the rotational eigen-frequencies depend only on the isolator radial stiffness, it is possible to modify the rotational to translational eigen-frequency ratio by adjusting the isolator axial stiffness, for example by changing the internal isolator construction. This modification provides the ability to set the rotational to translational eigen-frequency ratio without being totally constrained by geometry, as was the case previously. This modification permits independent control of the translational and rotational resonant frequencies (eigen-frequencies), which is of use in preventing stack-up of resonances. This feature may also be beneficial when system level constraints are placed on translational and rotational bandwidths.

The present invention provides the ability to independently adjust the suspension's translational and rotational resonant frequencies relative to one another by adjusting the isolator radial stiffness and axial stiffness relative to each other. Referring to the stiffness matrix K in the 4-isolator example above, the translational stiffness is determined by $$k \text{ average} = \left(\frac{2k_r + k_a}{3}\right)$$

while the rotational stiffness is determined only by $k_r$. Thus, $k_r$ may be selected to achieve the appropriate rotational stiffness, and consequently, rotational resonant frequency. $k_a$ may then be calculated to yield the desired translational stiffness, and consequently, translational resonant frequency.

The present invention provides the advantage of utilizing isolators with a sensor assembly while eliminating the problems caused by cross-axis acceleration coupling and cross-axis rotational coupling. Thus, sculling errors and other dynamic instrument or system errors resulting from combined translation and rotation are substantially eliminated without having to add additional computation, increasing the sampling rate of the sensors, or adding compensation algorithms. The present invention may be applied to isolators that have their radial stiffness different from their axial stiffness, as well as isolators where their radial stiffness is the substantially the same as their axial stiffness.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:

an assembly having a three dimensional geometric center point located within a representative cube and four isolators, each isolator intersecting a vertex of the cube;

the four isolators each located outside the cube;

the four isolators, each substantially axially symmetric about one of four axes and each operably coupled to the assembly such that each of the four axes substantially converges at the three dimensional geometric center point upon extension of each of the four axes beyond each of the isolators, respectively;

the cube having a first planar surface and a second planar surface that is parallel to the first planar surface, the first and second vertices being on opposing corners of the first planar surface, and the third and fourth vertices being on opposing corners of the second planar surface, a plane defining three of the first, second, third and fourth vertices does not include the other vertex.

2. The apparatus of claim 1, wherein the apparatus substantially eliminates cross-axis acceleration coupling.

3. The apparatus of claim 1, wherein the apparatus substantially eliminates cross-axis rotational coupling.

4. The apparatus of claim 1, wherein each of the isolators has substantially the same radial stiffness.

5. The apparatus of claim 1, wherein each of the isolators has substantially the same axial stiffness.

6. The apparatus of claim 1, wherein each of the isolators has substantially the same physical characteristics.

7. The apparatus of claim 1, wherein the assembly is an iso-inertial instrument sensor assembly.

8. The apparatus of claim 1, wherein the three dimensional geometric center point is the center of gravity of the assembly.

9. The apparatus of claim 1, wherein the assembly supports gyroscopes and accelerometers in inertial navigation systems.

10. The apparatus of claim 1, wherein each of the isolators has a radial stiffness and an axial stiffness, and the radial stiffness is substantially the same as the axial stiffness.

11. The apparatus of claim 1, wherein the plurality of four isolators is equally distributed about the three dimensional geometric center point.

12. An apparatus comprising:

an assembly having a three dimensional geometric center point located within a representative cube;

a first isolator having a first axis about which the first isolator is substantially axially symmetric, wherein the first isolator is operably coupled to the assembly such that the first axis extends substantially through the three dimensional geometric center point and a first vertex of the cube;

a second isolator having a second axis about which the second isolator is substantially axially symmetric, wherein the second isolator is operably coupled to the assembly such that the second axis extends substantially through the three dimensional geometric center point and a second vertex of the cube;

a third isolator having a third axis about which the third isolator is substantially axially symmetric, wherein the third isolator is operably coupled to the assembly such that the third axis extends substantially through the three dimensional geometric center point and a third vertex of the cube; and at least a fourth isolator having at least a fourth axis about which the at least the fourth isolator is substantially axially symmetric, wherein the at least the fourth isolator is operably coupled to the assembly such that the at least fourth axis extends substantially through the three dimensional geometric center point and a fourth vertex of the cube;

said first, second, third and at least fourth isolators disposed outside a tetrahedral shape defined by the first, second, third and fourth vertices of the cube;

the cube having a first planar surface andd a second planar surface that is parallel to the first planar surface, the first and second vertices being on opposing corners of the first planar surface, and the third and fourth vertices being on opposing corners of the second planar surface, a plane defining three of the first, second, third and fourth vertices does not include the other vertex.

13. The apparatus of claim 12, wherein the at least four isolators are equally distributed about the three dimensional geometric center point.

* * * * *